United States Patent [19]
Baumann

[11] Patent Number: 5,950,668
[45] Date of Patent: Sep. 14, 1999

[54] CONTROL VALVE POSITIONERS HAVING IMPROVED OPERATING CHARACTERISTICS

[75] Inventor: Hans D. Baumann, Rye, N.H.

[73] Assignee: Fisher Controls International, Inc., Clayton, Mich.

[21] Appl. No.: 08/935,764

[22] Filed: Sep. 23, 1997

Related U.S. Application Data

[60] Provisional application No. 60/028,015, Oct. 9, 1996.

[51] Int. Cl.$^6$ .............................. F16K 31/12; F16K 31/02
[52] U.S. Cl. ................. 137/487.5; 137/486; 251/129.04
[58] Field of Search ................................ 137/486, 487.5; 251/129.04

[56] References Cited

U.S. PATENT DOCUMENTS

| | | | |
|---|---|---|---|
| 3,906,196 | 9/1975 | Spitz | 235/150.1 |
| 4,103,695 | 8/1978 | Aono | 137/1 |
| 4,366,743 | 1/1983 | Leszczewski | 91/363 R |
| 4,386,553 | 6/1983 | Thoman et al. | 91/361 |
| 4,417,312 | 11/1983 | Cronin et al. | 137/487.5 |
| 4,481,451 | 11/1984 | Kautz et al. | 251/129.04 |
| 4,506,642 | 3/1985 | Pfalzhgraf et al. | 251/129.04 |
| 4,546,426 | 10/1985 | Hafner et al. | 364/153 |
| 4,742,465 | 5/1988 | Eastman | 364/167 |
| 4,842,162 | 6/1989 | Merkel | 222/1 |
| 4,901,625 | 2/1990 | Bussan et al. | 91/361 |
| 4,925,156 | 5/1990 | Stoll et al. | 251/129.04 |
| 4,926,903 | 5/1990 | Kawai | 251/129.04 |
| 4,961,441 | 10/1990 | Salter | 137/487.5 |
| 5,054,650 | 10/1991 | Price | 137/487.5 |
| 5,159,949 | 11/1992 | Prescott et al. | 251/129.04 |
| 5,179,330 | 1/1993 | Nikolaus | 318/567 |
| 5,285,715 | 2/1994 | Elrod et al. | 91/361 |
| 5,304,093 | 4/1994 | Sharp et al. | 454/61 |
| 5,431,182 | 7/1995 | Brown | 137/487.5 |

FOREIGN PATENT DOCUMENTS

| | | |
|---|---|---|
| 0 115 337 A2 | 8/1984 | European Pat. Off. . |
| 0 257 261 A1 | 3/1988 | European Pat. Off. . |
| 04 047 308 | 2/1992 | Japan . |
| 07 269 505 | 10/1995 | Japan . |

OTHER PUBLICATIONS

Baumann, Hans D., "Positioners set the Course for Modern Control Valve Designs", I&CS, May, 1997, pp. 41–45.

*Primary Examiner*—Denise L. Ferensic
*Assistant Examiner*—Joanne Y. Kim
*Attorney, Agent, or Firm*—Wolf, Greenfield & Sacks, P.C.

[57] ABSTRACT

A control assembly includes a positioner/actuator and a control valve. The positioner/actuator includes a valve actuator and a positioner for controlling actuator position and speed in response to a control signal. The control valve has a characteristic flow rate as a function of time. The positioner may include an electronic control circuit for modifying the travel speed of the actuator to produce a desired flow rate as a function of time. The positioner may determine an error between a desired actuator position and an actual actuator position and apply a correction signal to reduce the error. The correction signal is asymmetric with respect to error polarity.

17 Claims, 11 Drawing Sheets

CONTROL VALVE POSITIONERS HAVING IMPROVED OPERATING CHARACTERISTICS

CROSS REFERENCE TO RELATED APPLICATION

This application claims the benefit of provisional application Ser. No. 60/028,015, filed Oct. 9, 1996.

FIELD OF THE INVENTION

This invention relates to control valve assemblies which include a control valve, a valve actuator and a valve positioner, and, more particularly, to control valve assemblies which provide improved performance in process control systems.

BACKGROUND OF THE INVENTION

Control valve assemblies are commonly used in process control systems. The control valve assembly is typically part of a feedback loop including a process controller and a sensor. The process controller establishes a set point for the process, and the sensor senses a parameter that is dependent on the flow rate of the control valve. When the sensed parameter differs from a desired value, the process controller provides a control signal to the control valve assembly to change the flow rate and thereby reduce deviations from the desired parameter value.

A control valve assembly includes a control valve, a valve actuator and a valve positioner. The control valve may have a variety of configurations, including but not limited to rotary valves, butterfly valves and globe valves. The valve positioner receives an electrical control signal from the process controller and provides an actuator signal to the valve actuator. The positioner may receive an analog signal or a digital signal from the process controller. The valve actuator mechanically controls the valve position. Pneumatic actuators may control valve position in response to controlled air pressure. The air pressure, in turn, may be controlled by a solenoid valve or a piezoelectric device. In a digital positioner, the pneumatic actuator is controlled by air pulses at a prescribed pulse rate. Current-to-pneumatic actuators may also be utilized.

The operating characteristics of the control valve assembly are an important factor in the overall performance of the process control system. Generally, the control valve should provide relatively uniform performance over a range of operating conditions and should not adversely affect the stability of the process control system. One parameter of importance is the gain of the control valve assembly, defined as the change in flow rate for a given change in the control signal. Preferably the gain should be constant or nearly constant over the operating range of the control valve. However, different types of control valves exhibit different, often non-linear changes in flow rate as a function of change in actuator position. It is known to provide a valve positioner having a non-linear characteristic which compensates for the non-linear characteristic of the control valve and provides a linear overall relation between flow rate and control signal.

The gain of the control valve assembly is a static characteristic. Dynamic behavior must also be taken into consideration. Typically, prior art control valves have been operated at constant speed, often resulting in a non-linear change in flow rate as a function of time. For example, the flow rate may change rapidly near the low end of the control signal range but may change slowly near the upper end of the control signal range, despite the fact that the actuator speed is constant. Such characteristics may adversely affect the performance of the process control system. For example, the stability of the process control system may be adversely affected if the control valve assembly reacts slowly under some conditions and rapidly under other conditions.

The control valve assembly should react quickly to control signals which require a change in control valve flow rate. Thus, as described above, the positioner typically operates the actuator at or near maximum speed. To avoid overshoot of the desired flow rate, the speed is typically reduced as the valve approaches the desired flow rate. In a digital positioner, this is accomplished by reducing the pulse rate of the air pulses supplied to the pneumatic actuator. Despite this approach, overshoot may occur. For some values of phase shift in the process control feedback loop, unstable operation may result. U.S. Pat. No. 3,906,196 issued Sep. 16, 1975 to Spitz discloses a feedback system wherein a control signal is a non-linear function of an error signal. The non-linear function is symmetrical with respect to error polarity.

Accordingly, it is desirable to provide control valve assemblies wherein one or more of the above drawbacks are overcome.

SUMMARY OF THE INVENTION

According to a first aspect of the invention, a control valve assembly is provided. The control valve assembly comprises a positioner/actuator and a control valve. The positioner/actuator comprises a valve actuator having an actuator position and a positioner for controlling the actuator position. The control valve has a characteristic flow rate as a function of time in response to a constant travel speed of the actuator. The positioner includes an electronic control circuit for modifying the travel speed of the actuator as a function of time to produce a desired flow rate as a function of time in response to a specified control signal.

The electronic control circuit may include means for modifying travel speed of the actuator to produce an approximately linear change in flow rate as a function of time. In one embodiment, the electronic control circuit provides pulses to the actuator and modifies the travel speed of the actuator by changing the pulse rate of the pulses supplied to the actuator.

According to another aspect of the invention, a control valve assembly is provided. The control valve assembly comprises a positioner/actuator and a control valve. The positioner/actuator comprises a valve actuator having an actuator position and a positioner for controlling the actuator position in response to a control signal. The control valve has a characteristic flow rate as a function of the actuator position. The positioner comprises means for determining an error between a desired actuator position and an actual actuator position and means responsive to the error for applying a correction signal to the actuator to reduce the error. The correction signal has a first characteristic when the error is positive and a second characteristic when the error is negative. The first and second characteristics of the correction signal are different.

In one embodiment, the positioner provides pulses to the actuator. The correction signal has a first pulse rate as a function of error when the error is positive and a second pulse rate as a function of error when the error is negative. The pulse rate as a function of error is different for positive and negative errors. Preferably, the pulse rate as a function of error is non-linear.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
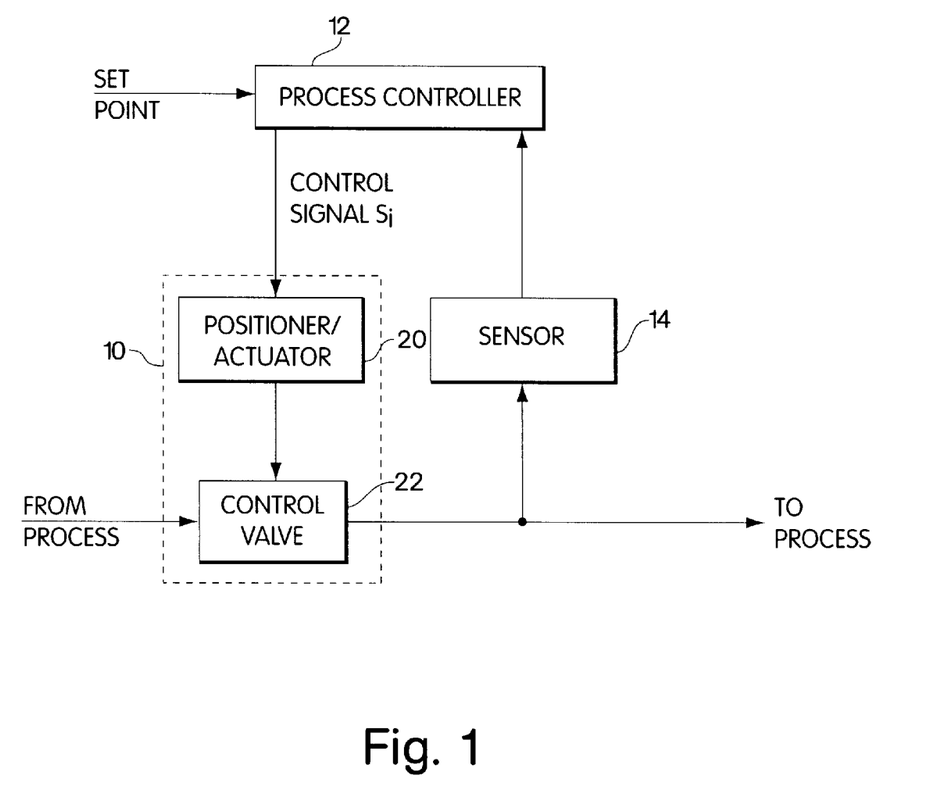
FIG. 1 is a block diagram of a process control system incorporating a control valve assembly in accordance with the present invention.

A block diagram of a process control system is shown in FIG. 1. A control valve assembly 10 controls a liquid or gas flow in a process being controlled. The control valve assembly 10 receives a control signal $S_i$ from a process controller 12. The process controller 12 receives from an operator or other external source a set point that establishes a flow rate for the control valve assembly. A sensor 14 senses a flow rate or other parameter of interest and provides a sensor signal to the process controller 12. The sensor 14 may sense the flow rate of the control valve assembly 10 or another parameter in the process that is a function of the control valve flow rate. The process controller 12 processes the sensor signal and the set point and provides the control signal to the control valve assembly 10 to maintain a desired operating condition. The control valve assembly 10, the process controller 12 and the sensor 14 constitute a process control loop. In a simple example, the process controller 12 may maintain a constant flow rate despite varying conditions in the process being controlled. It will be understood that in a typical process control system, the process controller 12 controls multiple control valves and other components associated with the process.

The control valve assembly 10 includes a positioner/actuator 20 and a control valve 22. The control valve 22 may have a variety of sizes and configurations. For example, the control valve 22 may be a rotary valve, a butterfly valve, or a globe valve. The positioner/actuator 20 includes a valve actuator for mechanically controlling the flow rate of control valve 22. Actuator operation is characterized by an actuator position and an actuator speed. Pneumatic actuators are commonly utilized. A positioner controls the actuator position and speed in response to an electrical control signal. In a typical example, the positioner converts the electrical control signal to a series of air pulses for controlling the pneumatic actuator. Control valve assemblies are generally known in the art and are commercially available. An example of a control valve assembly suitable for incorporation of the present invention is the model 2400S, manufactured and sold by H. D. Baumann, Inc.

Figure 2:
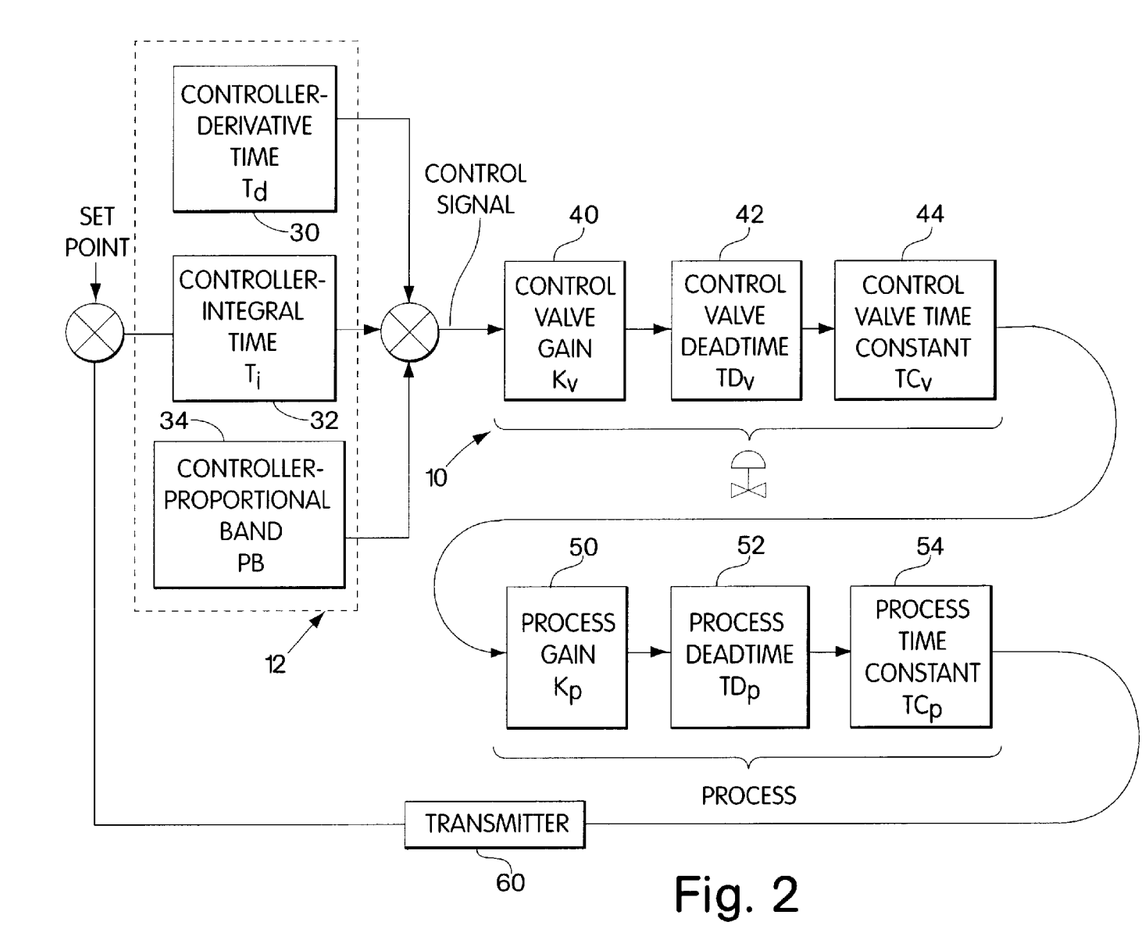
FIG. 2 is a schematic block diagram of the process control system, illustrating parameters that affect system operation.

A schematic block diagram that represents the parameters of the process control system of FIG. 1 is shown in FIG. 2. The system is characterized by controller 12 parameters including controller derivative time 30, controller integral time 32 and controller proportional band 34. The control valve assembly 10 is characterized by a control valve gain 40, a control valve deadtime 42 and a control valve time constant 44. The control valve gain is the change in flow rate for a given change in control signal. The control valve deadtime is a delay in responding to the control signal, typically caused by friction in the control valve 22. The control valve time constant is the time required to effect a two thirds change in flow rate in response to a control signal change over the full span. The process is characterized by a process gain 50, a process deadtime 52 and a process time constant 54. A transmitter 60 (sensor) supplies a sensor signal from the process to the controller. The controller compares the sensor signal with a set point and provides the control signal to the control valve assembly to control the operation of the control valve. It will be understood that the parameters shown in FIG. 2 affect the operation and stability of the process control system.

Figure 3A:
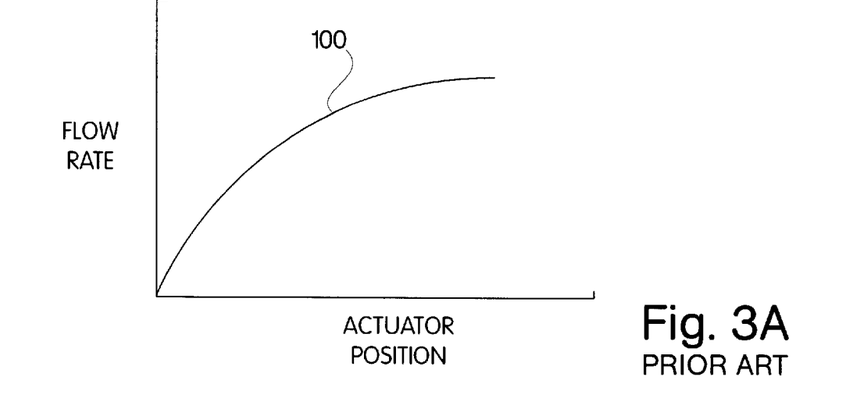
FIG. 3A is a graph of flow rate as a function of actuator position for a prior art control valve assembly.
Figure 3B:
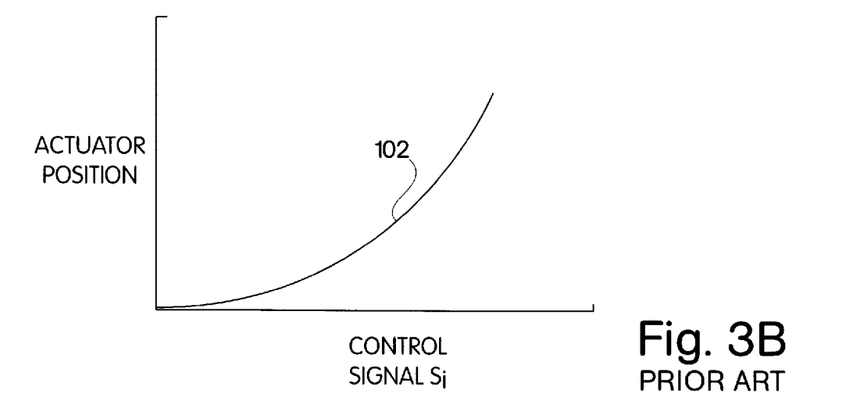
FIG. 3B is a graph of actuator position as a function of control signal for a prior art control valve assembly.
Figure 3C:
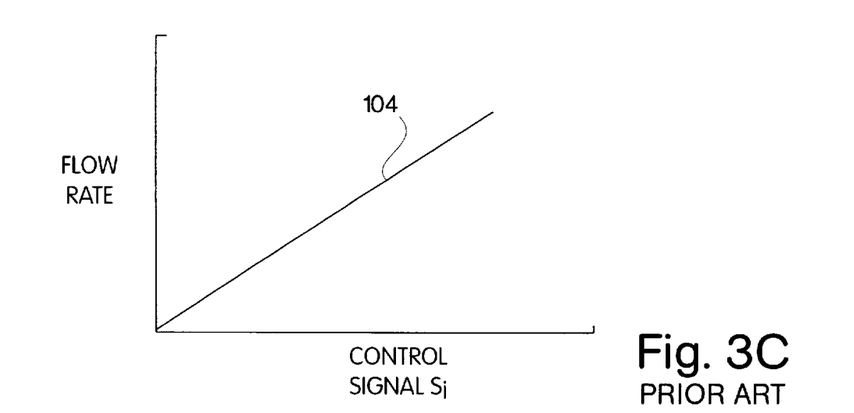
FIG. 3C is a graph of flow rate as a function of control signal for a prior art control valve assembly.

A graph of flow rate as a function of actuator position for a typical control valve is illustrated in FIG. 3A as curve 100. Quite often and by way of illustration, the flow rate is a non-linear function of actuator position. The characteristic curve may be different for different control valve types. Preferably, the flow rate of the control valve assembly is a linear function of the control signal $S_i$ to ensure stable and uniform operation over a range of flow rates. Accordingly, the actuator position may be a non-linear function of control signal, as illustrated by curve 102 in FIG. 3B. The curve 102 is selected to compensate for the non-linearity of the control valve characteristic (curve 100). The resulting flow rate is a linear function of control signal, as illustrated by curve 104 in FIG. 3C. FIGS. 3A–3C illustrate linearization of the gain of the control valve assembly.

The non-linear actuator position as a function of control signal, curve 102, may be implemented in an electronic circuit that converts the control signal to an actuator input, such as air pulses. In other embodiments, the curve 102 may be implemented mechanically, such as, for example, by a cam in the control valve.

Figure 3D:
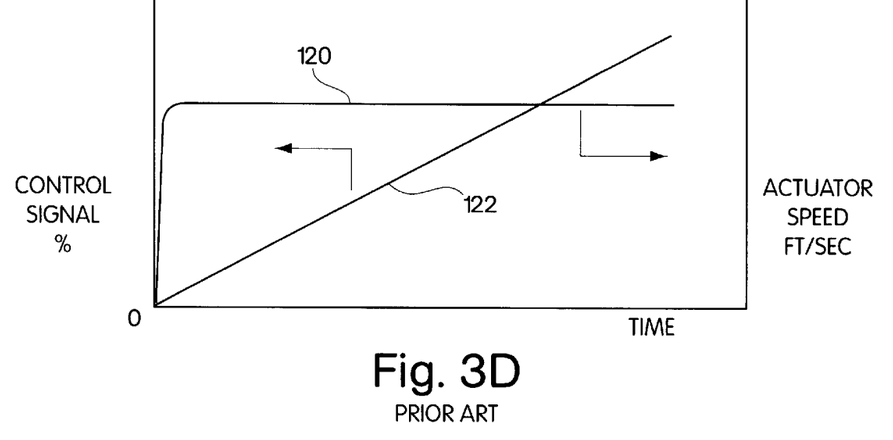
FIG. 3D is a graph of percent control signal and actuator speed as a function of time for a prior art control valve assembly.
Figure 3E:
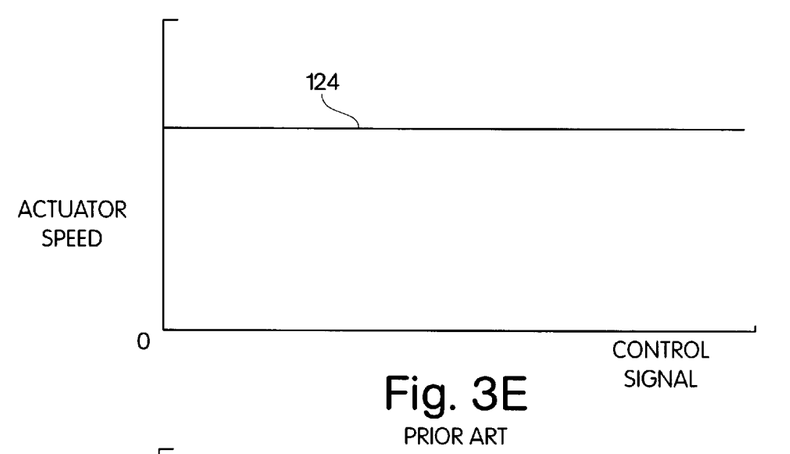
FIG. 3E is a graph of actuator speed as a function of control signal for a prior art control valve assembly.

Another parameter of importance in the operation of the control valve assembly is actuator speed. As shown in FIG. 3D, the actuator is typically operated at constant speed, as represented by curve 120, independent of the percent control signal. (At zero percent control signal, the valve is fully closed, and at 100 percent control signal, the valve is fully open.) For a control signal that increases with time, as represented by curve 122, the actuator speed is constant at or near maximum actuator speed. Constant actuator speed as a function of control signal is illustrated in FIG. 3E as curve 124. Constant actuator speed may produce a flow rate that is a non-linear function of time, as illustrated by curve 130 in FIG. 3F. According to curve 130, the flow rate increases rapidly when the control signal is first applied, and then increases more slowly as the valve opens. The reverse is true when the control signal causes the flow rate to decrease. This non-linear flow rate as a function of time may be undesirable in some process control systems. The control valve assembly responds relatively rapidly to control signals near the low end of the control signal range and relatively slowly to control signals near the upper end of the control signal range. As a result, the process control system exhibits non-uniform behavior and may be unstable under certain conditions. Ideally, it is desirable to maintain an approximately constant ratio of the time constant of the process to the time constant of the control valve assembly.

Figure 3F:
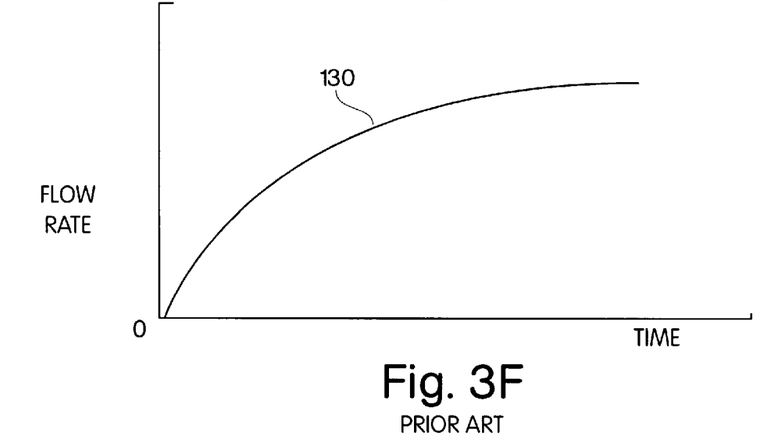
FIG. 3F is a graph of flow rate as a function of time for a prior art control valve assembly.
Figure 4A:
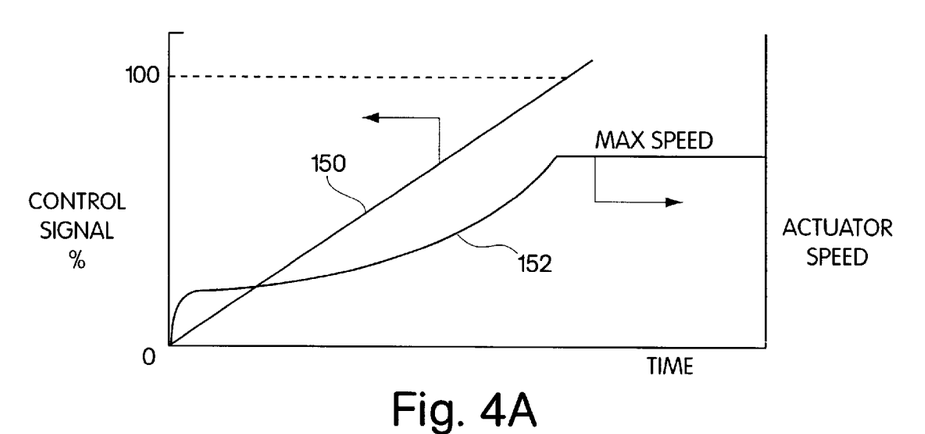
FIG. 4A is a graph of percent control signal and actuator speed as a function of time for a control valve assembly in accordance with a first aspect of the invention.
Figure 4B:
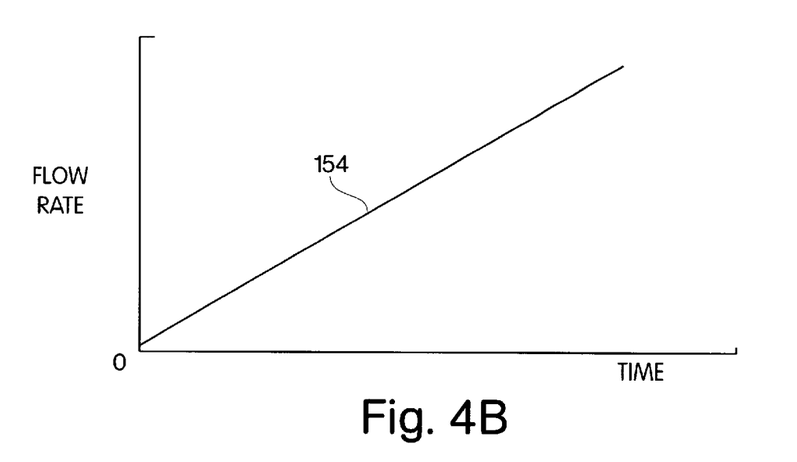
FIG. 4B is a graph of flow rate as a function of time for a control valve assembly in accordance with the invention.
Figure 4C:
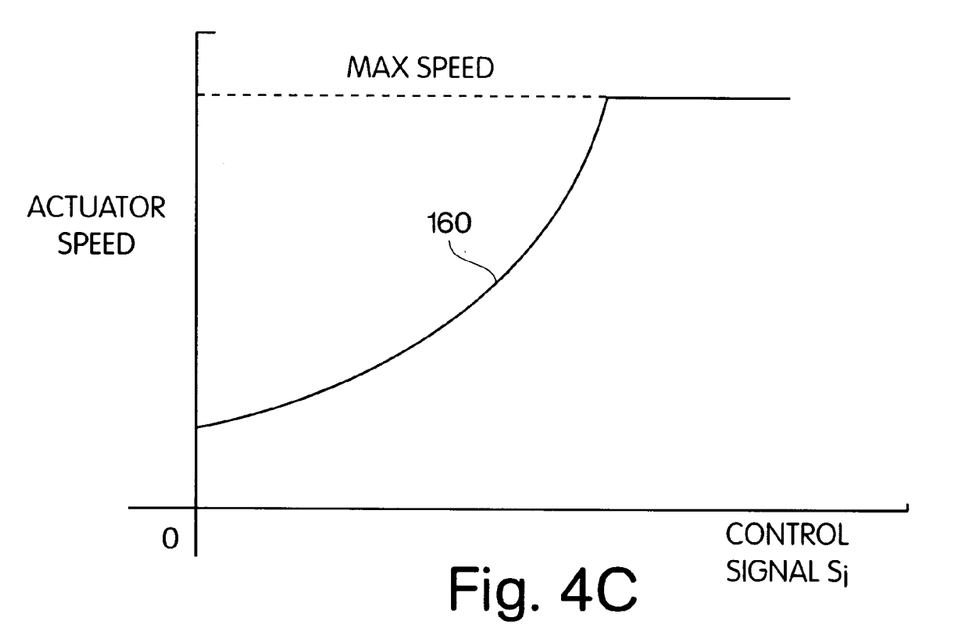
FIG. 4C is a graph of actuator speed as a function of control signal for a control valve assembly in accordance with the invention.

According to a first aspect of the invention, the actuator speed is modified to provide a desired flow rate as a function of time and control signal, as illustrated in FIGS. 4A–4C. In FIG. 4A, a linearly increasing control signal as a function of time is represented by curve 150. The control signal may vary between zero and 100 percent. The actuator speed as a function of time, represented by curve 152, starts at a relatively low value when the control signal is first applied and increases with time until the maximum actuator speed is reached. The shape of curve 152 is selected to provide a desired flow rate as a function of time. In the example of FIG. 3F, the flow rate increases rapidly following application of a control signal and then increases more slowly with increasing time. The actuator speed as a function of time (curve 152) may be selected to compensate for the nonlinearity of curve 130 in FIG. 3F and thereby provide a substantially linear flow rate as a function of time, as indicated by curve 154 in FIG. 4B. The curves 130 and 152 may, for example, be parabolas having inverse parameters which together produce a linear flow rate as a function of time.

It may be observed that the actuator speed is initially low according to curve 152 in FIG. 4A and increases to maximum speed, whereas the prior art configuration utilized the constant maximum speed. Accordingly, the modified actuator speed shown in FIG. 4A requires a longer time to reach a given flow rate than the prior art configuration. However, the configuration of FIGS. 4A and 4B exhibits uniform behavior and does not adversely affect the stability of the process control system.

FIG. 4A illustrates a change in control signal between zero and 100 percent. In most applications, the control signal may vary by 10% or less about a desired value in responding to the feedback loop of the process control system. Thus, it is appropriate to consider actuator speed as a function of control signal, as shown in FIG. 4C. The actuator speed is modified as a function of control signal according to curve 160. For small values of control signal, the actuator speed is relatively small, and for larger values of control signal, the actuator speed approaches and may reach maximum actuator speed. The curve 160 is selected to provide a desired response of the control valve. The curve 160 may have any desired shape between zero and maximum actuator speed.

It will be understood that the flow rate characteristic of the control valve as a function of time may be different for different valve types. Furthermore, the desired flow rate as a function of time is not necessarily linear. Accordingly, the modified actuator speed as a function of time may have any desired characteristic. The actuator speed does not necessarily increase with time, as illustrated by curve 152, and does not necessarily increase with control signal, as illustrated by curve 160. In general, the actuator speed is varied between zero and maximum actuator speed to produce a desired flow rate as a function of time for a given control valve characteristic.

The desired actuator speed as a function of time and actuator speed as a function of control signal curves may easily be implemented in conventional electronic circuitry. In the positioner/actuator 20 (FIG. 1), for example, a lookup table containing the desired actuator speeds may be implemented as a read-only memory (ROM). The ROM is addressed by the value of control signal, and the output value from the ROM corresponds to the desired actuator speed. The relationship between input addresses and output values represents the desired actuator speed as a function of control signal. The actuator speeds output from the table are used to control the actuator, for example, by varying the pulse rate supplied to the actuator. Other implementations of the modified actuator speed will be apparent to those skilled in the art. For example, the speed may be effected by the rate of current input to an analog current-to-air pressure converter.

Figure 5:
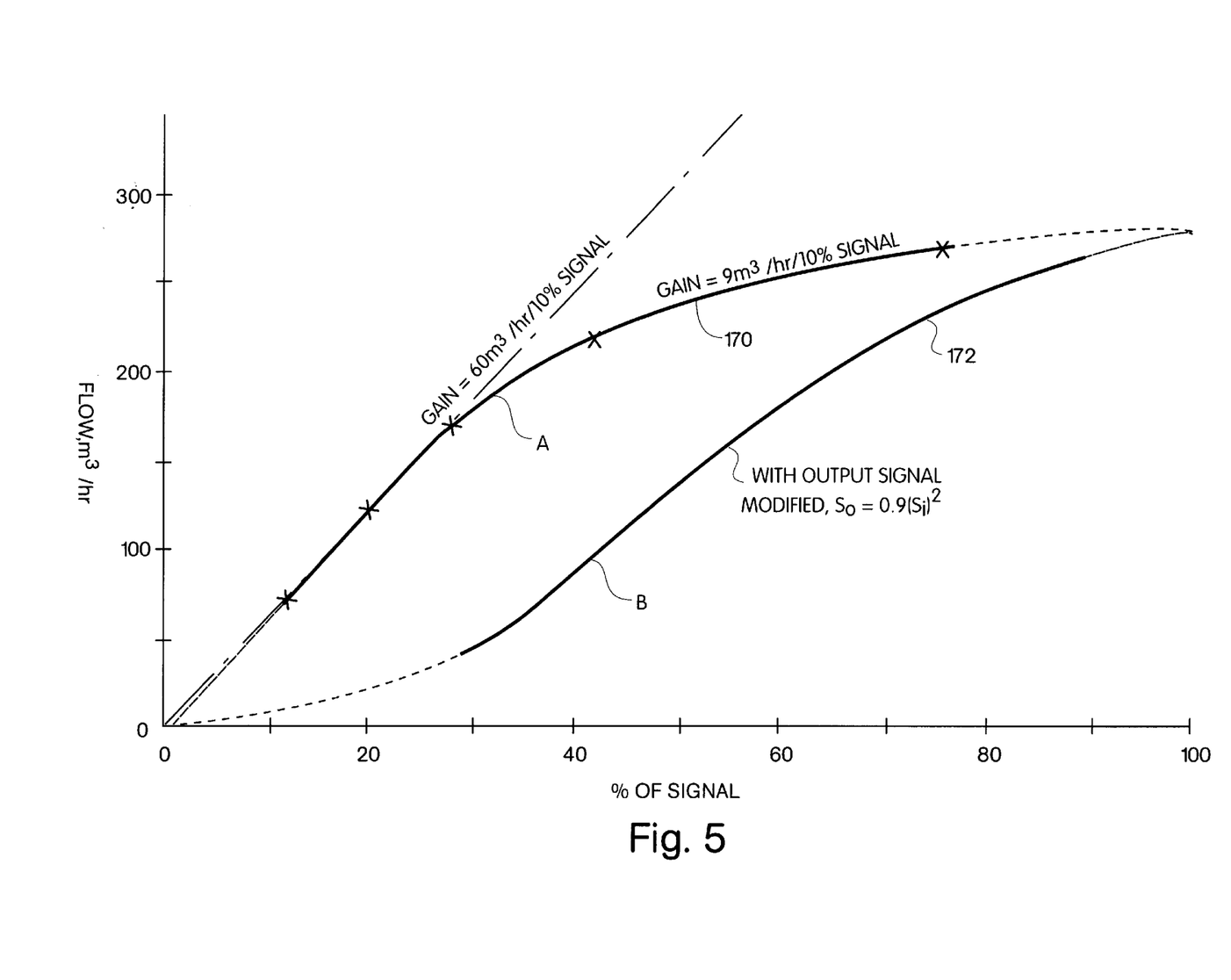
FIG. 5 is a graph of flow rate as a function of percent control signal for control valve assemblies with and without modification of positioner gain.

An example is now described with reference to FIGS. 5 and 6. In FIG. 5, flow rate is plotted as a function of percent control signal. Curve 170 represents the flow rate as a function of percent control signal, where the control signal is unmodified. It may be observed that the slope of curve 170 varies considerably over the range of zero to 100% control signal. The flow rate is a relatively non-linear function of control signal and saturates at large values of control signal. Curve 172 represents the flow rate as a function of percent control signal, where the signal supplied to the actuator has been modified to improve linearity. In particular, the actuator signal $S_o$ is modified in accordance with $S_o=0.9(S_i)^2$. The variation in the slope of the flow rate curve 172 is considerably less than the variation in slope of curve 170. Accordingly, the control valve characteristic has been substantially linearized.

Figure 6:
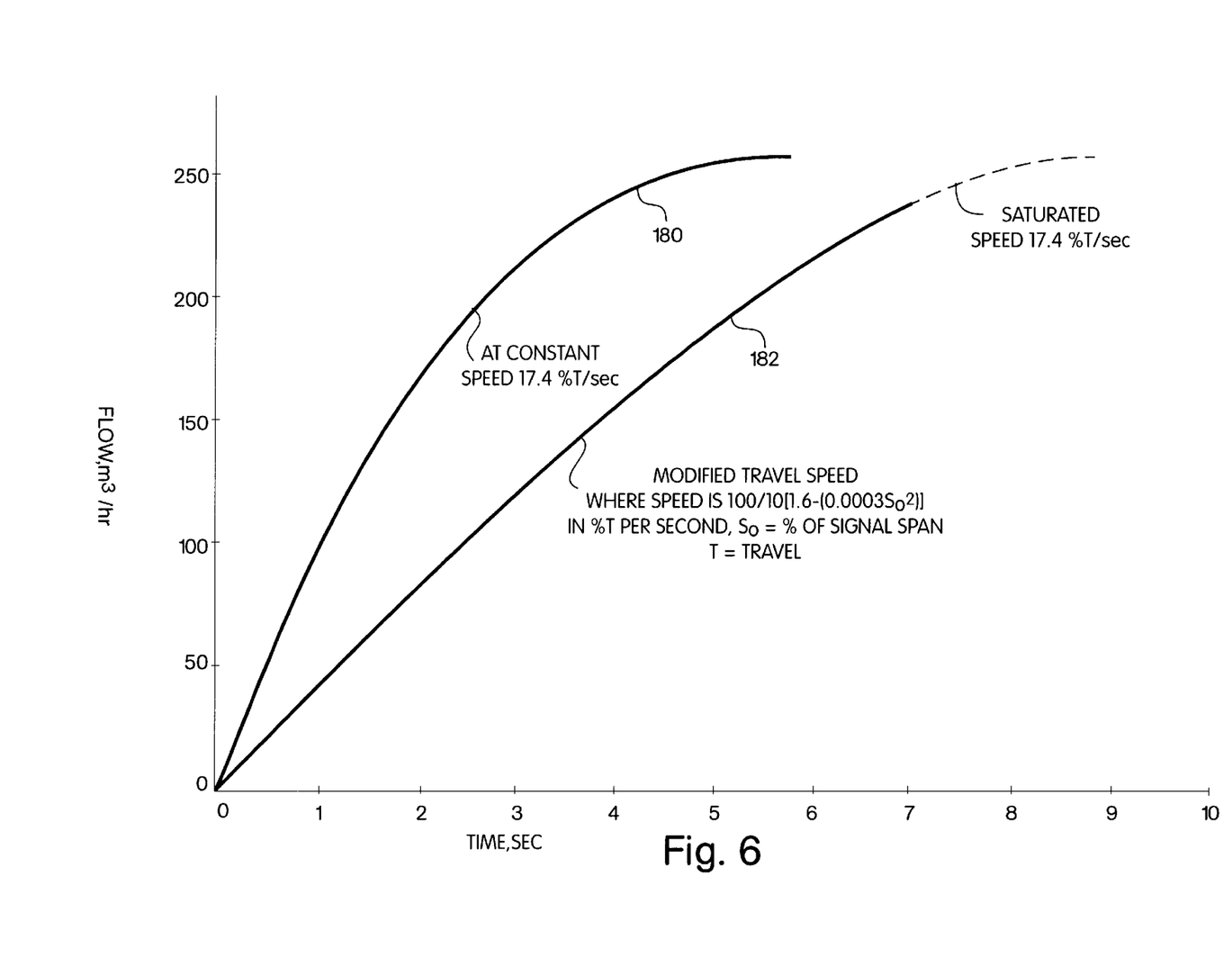
FIG. 6 is a graph of flow rate as a function of time for a control valve assembly utilizing constant actuator speed and for a control valve assembly using modified actuator speed in accordance with the present invention.

FIG. 6 shows the variation and flow rate as a function of time, using the data from curve 172 of FIG. 5, where the control valve normally travels from zero to 100 percent within 5.7 seconds. It is assumed that the actuator travel speed is constant for curve 180. This assumption is not always accurate, and depends on the positioner type, the air supply for a pneumatic positioner, and other variables. As indicated by curve 180 in FIG. 6, regardless of static gain adjustments shown in curve 172 of FIG. 5, the rate of change of flow as a function of time is extremely non-linear. For example, it takes only one second to change the flow from 0 to 112 cubic meters per hour, but three seconds to change from 218 cubic meters per hour to 260 cubic meters per hour. The variation in time constant is roughly 18:1. This control loop is expected to be stable only in the flow range from 0 to 100 cubic meters per hour.

By modifying the actuator signal, the actuator speed is modified to compensate for the non-linearity of the control valve characteristic. In the example of FIG. 6, the actuator speed is selected to be $100/10[1.6-(0.0003S_o^2)]$ in percentage travel per second, where $S_o$ is expressed as a percentage of total signal span to the positioner device controlling the air output to the actuator. The modified actuator speed is represented in FIG. 6 by curve 182. The above equation yields unobtainable speeds above 60% actuator signal $S_o$, so the maximum speed is limited to 17.4% of travel per second, the maximum obtainable speed of the actuator. The result is a dynamic flow characteristic in which the time constant does not vary by more than 2:1 from zero up to a flow rate of 240 cubic meters per hour, or up to 92% of the valve flow capacity.

Figure 7:
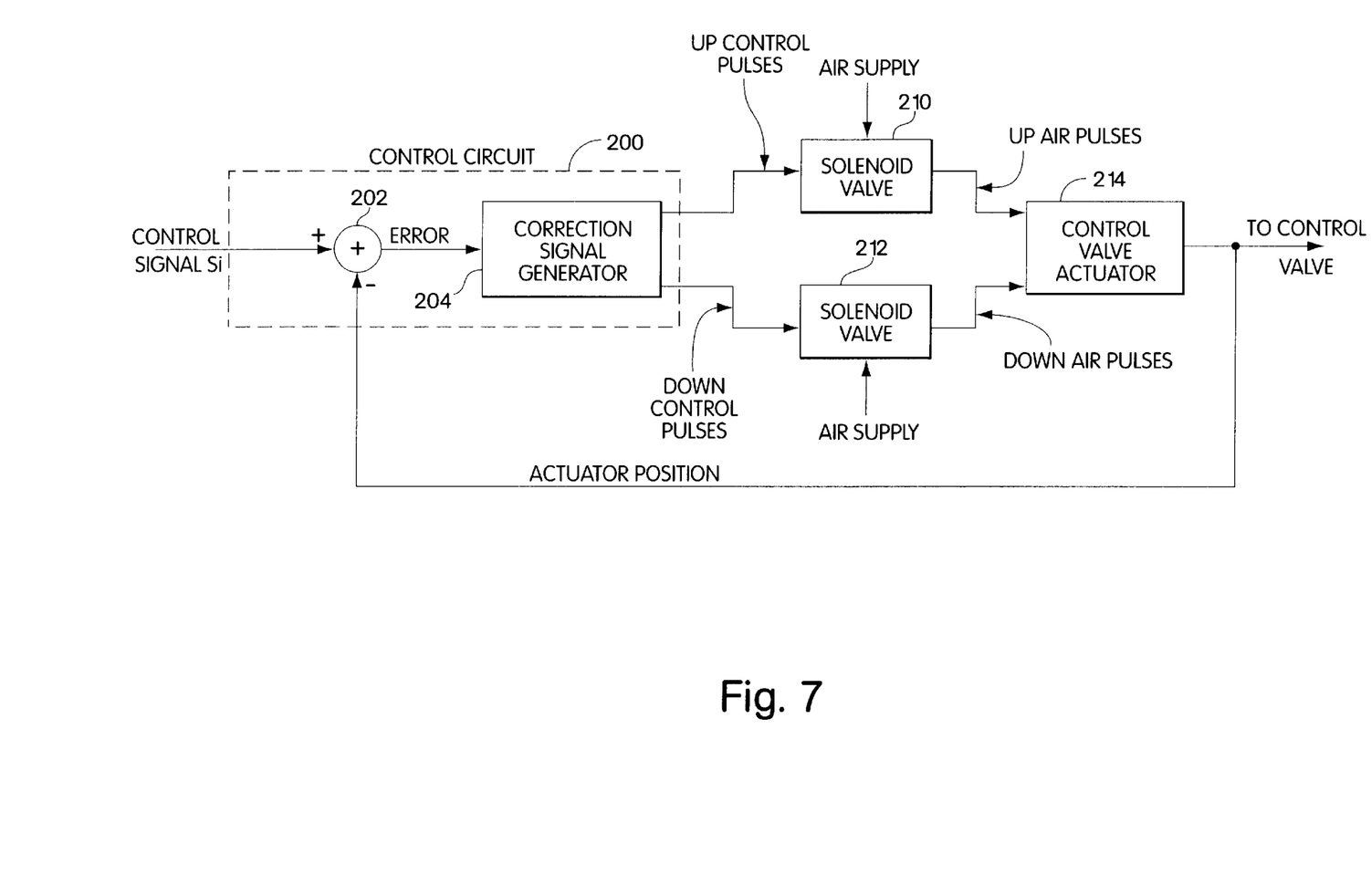
FIG. 7 is a block diagram of a positioner/actuator, illustrating a second aspect of the invention.

A second aspect of the invention is described with reference to FIGS. 7–10. A portion of the positioner/actuator 20 (FIG. 1) is shown in FIG. 7. A control circuit 200 including a summing unit 202 and a correction signal generator 204 receives the control signal $S_i$ from the process controller 12 (FIG. 1) and provides up control pulses to a solenoid valve 210 and down control pulses to a solenoid valve 212. Control circuit 200 also receives an actuator position signal representative of actual actuator position. The solenoid valves 210 and 212 control up and down air pulses supplied to a control valve actuator 214 in response to the up and down control pulses, respectively. The control valve actuator 214 controls the actuator position in response to the up and down air pulses. More specifically, up pulses increase the control valve flow rate and down pulses decrease the control valve flow rate.

In operation, the summing unit 202 subtracts the actuator position signal from the control signal and determines an error signal representative of the difference between the desired and actual actuator positions. The correction signal generator 204 generates up or down control pulses in response to the error signal. The pulse rate is a function of the error, as described in detail below. Each solenoid valve 210 and 212 receives pressurized air from an air supply and supplies air pulses to the control valve actuator 214 in response to the respective control pulses. The pulse rate of the air pulses corresponds to the rate of the respective control pulses. The air pulses cause the actuator position to change in a direction that reduces the error.

Figure 9:
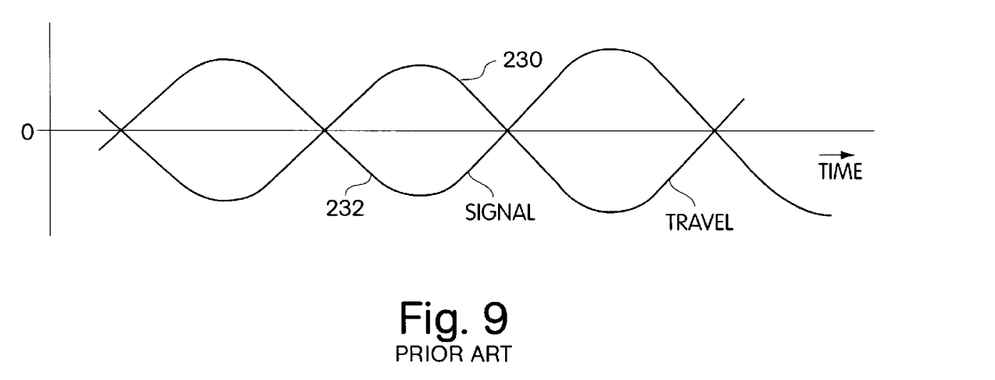
FIG. 9 is a graph of control signal and actuator position as a function of time, illustrating unstable behavior in a prior art control valve assembly.

In prior art systems, the correction signal which reduced the error between the control signal and the actual actuator position was typically a non-linear function of error. In particular, the correction signal was typically large for large errors and small for small errors. Furthermore, the correction signal as a function of error was symmetrical with respect to error polarity. Thus, positive and negative errors of equal magnitude produced correction signals of equal magnitude. The prior art configuration reduced overshoot but was subject to oscillation about the desired actuator position where the process control loop had a phase shift at or near 180°. As shown in FIG. 9, the actuator position, represented by curve 230, may be out of phase with the control signal, represented by curve 232, producing unstable behavior.

In accordance with the invention, the correction signal is preferably a non-linear function of error and is asymmetrical with respect to error polarity. An example of an asymmetric correction signal is plotted as a function of error in FIG. 8. The correction signal is represented by the pulse rate supplied to the control valve actuator 214. A correction signal function is represented by curve 240. The correction signal function 240 includes a first correction signal segment 242 where the error is positive and a second correction signal segment 244 where the error is negative. Each of the correction signal segments 242 and 244 is non-linear and has small values near zero error. Thus, for error values between about −1 and +1.5, the correction signal is zero or near zero. This effectively creates a deadband that reduces the tendency for oscillation about the desired valve position. Each of the correction signal segments 242 and 244 increases rapidly outside the deadband. However, the correction signal segments 242 and 244 are different, i.e., asymmetrical about zero error. Thus, for example, an error of +3 produces a pulse rate of about 2 in accordance with segment 242 and an error of −3 produces a pulse rate of about 4 in accordance with segment 244.

Figure 10:
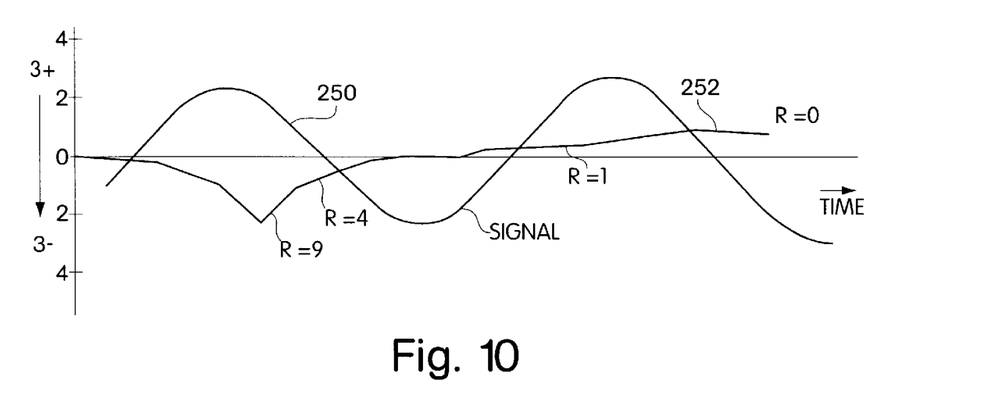
FIG. 10 is a graph of a control signal and actuator position as a function of time, illustrating stable behavior using the asymmetric correction function of the present invention.

The effect of the asymmetric correction signal is to reduce the risk of unstable behavior. In particular, any oscillation tends to be rapidly damped using the asymmetric correction signal. Referring to FIG. 10, a sinusoidal control signal 250 produces actuator travel as represented by curve 252. It may be observed that any oscillation is rapidly damped in the feedback loop of the process control system.

Figure 8:
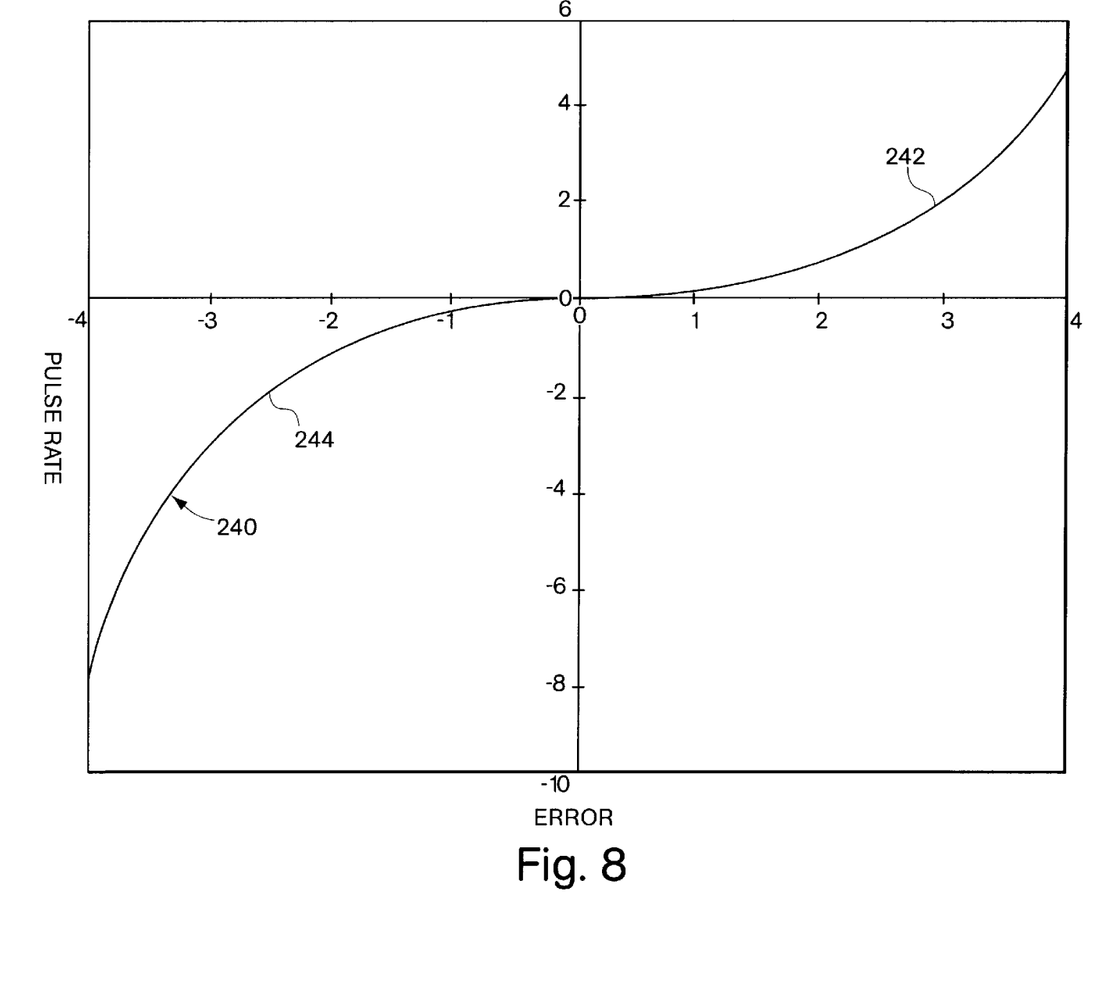
FIG. 8 is a graph of pulse rate as a function of error, wherein the pulse rate is an asymmetric function of error.

The asymmetric correction signal shown in FIG. 8 and described above may easily be implemented in the correction signal generator 204 of FIG. 7. For example, each error value may be used to address a lookup table implemented as a ROM. Positive error values address portions of the table which output values corresponding to correction signal segment 242 of FIG. 8. Negative error values address portions of the table which output values corresponding to correction signal segment 244 of FIG. 8. The respective output values control the rate of up control pulses or down control pulses supplied to the respective solenoid valves 210 and 212. It will be understood that other implementations may be utilized within the scope of the invention.

It will be understood that the correction signal function illustrated in FIG. 8 is only one example of a suitable asymmetric correction signal. In general, the correction signal function is preferably non-linear and is asymmetric with respect to error polarity. The asymmetric correction signal function has different correction signal curves for positive and negative error values. In one example, the pulse rate R may be represented as $R=(e-x)^n$, where e represents the positioning error in percent, x is an adjustable deadband and n is an adjustable exponent selected to match stability needs. The deadband x should be more than the minimum pulse width of the device. This function produces two different slew speeds above and below the set point. For example, when the error is −2% and with n=2 and x=1%, the pulse rate is $(-2-1)^2=9$. However, when the error is +2% and the pulse rate is $(+2-1)^2=1$. This non-linear response improves positioner stability.

While there have been shown and described what are at present considered the preferred embodiments of the present invention, it will be obvious to those skilled in the art that various changes and modifications may be made therein without departing from the scope of the invention as defined by the appended claims.

I claim:

1. A control valve assembly comprising:

a positioner/actuator comprising a valve actuator having an actuator position and a positioner for controlling said actuator position; and a control valve having a characteristic fluid flow rate passing through it as a function of time in response to a travel speed of said actuator, said positioner including an electronic control circuit for modifying the travel speed of said actuator as a function of time to produce a desired rate of change in fluid flow through the valve as a function of time in response to a specified control signal.

2. A control valve assembly as defined in claim 1, wherein said electronic control circuit includes means for modifying the travel speed of said actuator to produce an approximately linear change in flow rate as a function of time.

3. A control valve assembly as defined in claim 1, wherein said electronic control circuit further comprises means for modifying said actuator position as a function of said control signal to produce a predetermined flow rate as a function of said control signal.

4. A control valve assembly as defined in claim 3, wherein said predetermined flow rate is an approximately linear function of said control signal.

5. A control valve assembly as defined in claim 1, wherein said electronic control circuit provides pulses to said actuator and includes means for modifying the travel speed of said actuator by changing a pulse rate of the pulses supplied to said actuator.

6. A control valve assembly comprising:

a positioner/actuator comprising a valve actuator having an actuator position and a positioner for controlling said actuator position in response to a control signal; and a control valve having a characteristic fluid flow rate as a function of said actuator position, said positioner comprising means for determining an error between a desired actuator position and an actual actuator position and means responsive to said error for applying a correction signal to said actuator to reduce said error, said correction signal having a first characteristic determining an actuator speed when said error is positive and a second characteristic determining the actuator speed when said error is negative, wherein the first and second characteristics of said correction signal are different.

7. A control valve assembly as defined in claim 6, wherein said positioner provides pulses to said actuator and wherein said first and second characteristics each comprise a pulse rate of the pulses supplied to said actuator.

8. A control valve assembly as defined in claim 7, wherein said pulse rate is given by $R=(e-x)^n$, where e represents said error in percent, x is a deadband, and n is an exponent selected to match stability requirements.

9. A control valve assembly as defined in claim 6, wherein said first and second characteristics each comprise a correction signal magnitude supplied to said actuator.

10. A control valve assembly as defined in claim 6, wherein said first and second characteristics each comprise a nonlinear function of said error.

11. A control valve assembly comprising:

a positioner/actuator comprising a valve actuator and a positioner for controlling actuator position and speed in response to a control signal; and a control valve having a characteristic fluid flow rate passing through it as a function of said control signal, said positioner including an electronic control circuit for modifying the travel speed of said actuator as a function of said control signal to produce a desired rate of change in fluid flow through the valve as a function of time.

12. A control valve assembly as defined in claim 11, wherein said electronic control circuit includes means for modifying the travel speed of said actuator to produce an approximately linear change in flow rate as a function of time.

13. A control valve assembly comprising:

a positioner/actuator comprising a valve actuator and a positioner for controlling actuator position in response to a control signal; and a control valve having a characteristic flow rate as a function of said actuator position, said positioner comprising means for determining an error between a desired actuator position and an actual actuator position and means responsive to said error for applying a correction signal determining an actuator speed to said actuator to reduce said error, said correction signal being asymmetric with respect to polarity of said error.

14. A control valve assembly as defined in claim 13, wherein said correction signal comprises pulses supplied to said actuator at a rate R given by $R=(e-x)^n$, where e represents said error in percent, x is a deadband, and n is an exponent selected to match stability requirements.

15. A control valve assembly as defined in claim 13, wherein said correction signal is a nonlinear function of said error.

16. In a control valve assembly comprising a positioner/actuator including a valve actuator and a positioner for controlling actuator position and actuator speed in response to a control signal, and a control valve, a method for positioning said control valve comprising the step of:

modifying the travel speed of said actuator as a function of said control signal to produce a desired rate of change in fluid flow through the valve as a function of time.

17. In a control valve assembly comprising a positioner/actuator including a valve actuator and a positioner for controlling actuator position in response to a control signal, and a control valve, a method for positioning said control valve comprising the steps of:

determining an error between a desired actuator position and an actual actuator position;

generating a correction signal to reduce said error, said correction signal determining an actuator speed and being an asymmetric function of error polarity; and applying said correction signal to said actuator.

* * * * *